United States Patent
Yang et al.

(10) Patent No.: US 11,228,386 B2
(45) Date of Patent: Jan. 18, 2022

(54) BLOCKCHAIN NODE SYNCHRONIZATION METHOD AND DEVICE USING TRUST MECHANISM

(71) Applicant: BEIJING KINGSOFT INTERNET SECURITY SOFTWARE CO., LTD., Beijing (CN)

(72) Inventors: Wenyu Yang, Beijing (CN); Chunmeng Gao, Beijing (CN)

(73) Assignee: BEIJING KINGSOFT INTERNET SECURITY SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/760,188

(22) PCT Filed: Sep. 20, 2018

(86) PCT No.: PCT/CN2018/106774
§ 371 (c)(1),
(2) Date: Apr. 29, 2020

(87) PCT Pub. No.: WO2020/000708
PCT Pub. Date: Jan. 2, 2020

(65) Prior Publication Data
US 2021/0184780 A1 Jun. 17, 2021

(51) Int. Cl.
*H04J 3/06* (2006.01)
*H04L 9/06* (2006.01)
(Continued)

(52) U.S. Cl.
CPC .......... *H04J 3/0638* (2013.01); *H04L 9/0643* (2013.01); *H04L 43/065* (2013.01);
(Continued)

(58) Field of Classification Search
CPC ..... H04J 3/0638; H04J 3/0635; H04L 43/065; H04L 45/54; H04L 43/0888;
(Continued)

(56) References Cited

U.S. PATENT DOCUMENTS

| | | | |
|---|---|---|---|
| 6,810,427 B1* | 10/2004 | Cain | H04L 49/3009 709/238 |
| 2018/0285869 A1* | 10/2018 | Li | H04L 9/3247 |
| 2020/0151714 A1* | 5/2020 | Chan | H04L 9/0637 |

FOREIGN PATENT DOCUMENTS

CN 107819829 A 3/2018

OTHER PUBLICATIONS

International Search Report issued in International Application No. PCT/CN2018/106774 dated Mar. 19, 2019 (2 pages).
(Continued)

*Primary Examiner* — Kiet Tang
(74) *Attorney, Agent, or Firm* — Osha Bergman Watanabe & Burton LLP

(57) ABSTRACT

The present application proposes a blockchain node synchronization method and device using a trust mechanism. The method comprises: acquiring data throughput history data of each node in a routing table of a node to be synchronized; acquiring synchronization success rate history data of each node in the routing table of the node to be synchronized; acquiring a total difficulty value of a blockchain currently stored by each node in the routing table of the node to be synchronized; determining a credibility of each node in the routing table according to the data throughput history data, the synchronization success rate history data, and the total difficulty value of the blockchain; and selecting, according to the credibility of each node, a target
(Continued)

node for synchronization, and synchronizing, according to blockchain data stored by the target node, the node to be synchronized.

15 Claims, 3 Drawing Sheets

(51) Int. Cl.
*H04L 12/26* (2006.01)
*H04L 12/741* (2013.01)
*H04L 12/743* (2013.01)

(52) U.S. Cl.
CPC .......... *H04L 43/0888* (2013.01); *H04L 45/54* (2013.01); *H04L 45/7453* (2013.01); *H04L 2209/38* (2013.01)

(58) Field of Classification Search
CPC ............... H04L 9/0643; H04L 45/7453; H04L 2209/38; H04L 45/021; H04L 2209/00; H04L 9/06
See application file for complete search history.

(56) References Cited

OTHER PUBLICATIONS

Written Opinion issued in International Application No. PCT/CN2018/106774 dated Mar. 19, 2019 (3 pages).

\* cited by examiner

BLOCKCHAIN NODE SYNCHRONIZATION METHOD AND DEVICE USING TRUST MECHANISM

CROSS-REFERENCE TO RELATED APPLICATIONS

This application is a US National phase of International Application No. PCT/CN2018/106774, filed on Sep. 20, 2018, which claims priority to and benefits of Chinese Patent Application No. 201810713620.8, filed with the State Intellectual Property Office of P. R. China on Jun. 29, 2018 by BEIJING KINGSOFT INTERNET SECURITY SOFTWARE CO., LTD., titled "Method and Device for Synchronizing BlockChain Nodes Based On Trust Mechanism".

FIELD

The present disclosure relates to a field of computer applications and blockchain technologies, and more particularly, to a method and a device for synchronizing blockchain nodes based on a trust mechanism.

BACKGROUND

Currently, blockchain platforms mainly include Bitcoin platform and Ethereum platform. The Ethereum platform expands the first generation of encrypted digital currencies into programmable currencies, and supports third-party developers to develop smart contract applications and issue digital tokens in their platforms, thereby greatly expanding application scenarios of the blockchain. Currently, the Ethereum platform has become the most popular public chain system in the blockchain industry.

An important feature of the blockchain is that block information of the entire blockchain is stored at each node. Therefore, block data of all nodes of the entire platform needs to be updated synchronously. In the Ethereum platform, a new block is generated every 10 seconds. Compared to the Bitcoin platform, which generates a block every 10 minutes, a higher updating efficiency of the block data is required. Currently, the number of nodes on the Ethereum platform is about 100,000 orders of magnitude and is constantly growing. Meanwhile, transaction volume is also increasing with the popularity of blockchain technologies, resulting in continuous increase of the capacity of each block within an allowable range, which brings great challenges to efficient synchronization among the nodes of the blockchain.

Currently, network layers of the Ethereum system use the Kademelia P2P communication protocol based on Distributed Hash Table (DHT). DHT is a distributed storage method. When no server is required, each client is responsible for a small range of rout and is responsible for storing a small portion of data, so as to achieve addressing and storage of an entire DHT network. In this protocol, a routing table maintained by each node is composed of 17 buckets, and each bucket contains 16 nodes. The total number of nodes in the routing table does not exceed 17*16. During the synchronization process, a Total Difficulty (TD) value of a blockchain in the block data of each node in the routing table is obtained in sequence. The higher the TD value, the higher the height of the blockchain contained in the node, that is, the larger the number of blocks contained in the node. According to the TD value of each node, new block data is obtained from the node with the highest TD value to complete the synchronization.

In the communication protocol of Ethereum, by default, the routing table of a node is determined based on an ID (identity) of the node. When the ID of the node is constant, the routing table of the node is roughly constant. Therefore, a failure often occurs in a synchronization for the node when a network status of an adjacent node of the current node is not good, such as when the network is frequently disconnected or the network throughput capacity is limited. Once the synchronization is failed, a transaction status of the current node is not up-to-date, which brings great security problems. Therefore, the node synchronization strategy needs to be improved.

SUMMARY

Embodiments of the present disclosure aim to solve at least one of the technical problems in the related art, improve the blockchain node synchronization strategy, and provide a method and a device for synchronizing blockchain nodes based on a trust mechanism.

In order to achieve the above objects, embodiments of a first aspect of the present disclosure provide a method for synchronizing blockchain nodes based on a trust mechanism. The method includes: obtaining historical data of data throughput of each node in a routing table of a node to be synchronized; obtaining historical data of synchronization success rate of each node in the routing table of the node to be synchronized; obtaining a total difficulty value of a blockchain currently stored by each node in the routing table of the node to be synchronized; determining a credibility of each node in the routing table according to the historical data of data throughput, the historical data of synchronization success rate, and the total difficulty value of the blockchain; selecting a target node for synchronization according to the credibility of each node, and synchronizing the node to be synchronized according to the blockchain stored by the target node.

In some embodiments, determining the credibility of each node in the routing table according to the historical data of data throughput, the historical data of synchronization success rate, and the total difficulty value of the blockchain, includes: calculating an average value of the data throughput of each node in a recent predefined time interval according to the historical data of data throughput, and using the average value as a data throughput parameter; obtaining a reputation value of each node according to the historical data of synchronization success rate, in which the reputation value is a value calculated according to a predefined rule based on the historical data of synchronization success rate; and determining the credibility of each node according to the data throughput parameter, the reputation value, and the total difficulty value of the blockchain.

In some embodiments, determining the credibility of each node in the routing table according to the data throughput parameter, the reputation value, and the total difficulty value of the blockchain, includes: for each node, performing a weighted summation on the data throughput parameter, the reputation value, and the total difficulty value of the blockchain of the node according to predefined weighting coefficients, and determining the credibility of the node according to a result of the weighted summation.

In some embodiments, obtaining the reputation value of each node according to the historical data of synchronization success rate includes calculating the reputation value of each node recursively according to the following formula:

$$\xi = \xi_{-1} + \sqrt{\frac{N}{N+1}} \cdot \varphi$$

in which ξ represents a current reputation value of the node; $\xi_{-1}$ represents a historical reputation value of the node most recently calculated; N is the number of times that the node is successfully synchronized as the target node in a predefined number of most recent node synchronization operations; and φ is a predefined reward and punishment coefficient.

With the method for synchronizing blockchain nodes based on the trust mechanism according to the present disclosure, it can be ensured that the selected target node for synchronization not only has a large TD value, but also has a good network state and a low error probability. Therefore, a stability of the synchronization operation is guaranteed from multiple aspects, and the synchronization success rate is improved.

In order to achieve the above objects, embodiments of a second aspect of the present disclosure provide a device for synchronizing blockchain nodes based on a trust mechanism. The device includes: a throughput obtaining module, configured to obtain historical data of data throughput of each node in a routing table of a node to be synchronized; a synchronization success rate obtaining module, configured to obtain historical data of synchronization success rate of each node in the routing table of the node to be synchronized; a blockchain total difficulty value obtaining module, configured to obtain a total difficulty value of a blockchain currently stored by each node in the routing table of the node to be synchronized; a credibility computing module, configured to determine a credibility of each node in the routing table according to the historical data of data throughput, the historical data of synchronization success rate, and the total difficulty value of the blockchain; and a node synchronizing module, configured to select a target node for synchronization according to the credibility of each node, and to synchronize the node to be synchronized according to the blockchain stored by the target node.

In some embodiments, the credibility computing module is configured to determine the credibility of each node in the routing table according to the historical data of data throughput, the historical data of synchronization success rate, and the total difficulty value of the blockchain by: calculating an average value of the data throughput of each node in a recent predefined time interval according to the historical data of data throughput, and using the average value as a data throughput parameter; obtaining a reputation value of each node according to the historical data of synchronization success rate, in which the reputation value is a value calculated according to a predefined rule based on the historical data of synchronization success rate; and determining the credibility of each node according to the data throughput parameter, the reputation value, and the total difficulty value of the blockchain.

In some embodiments, the credibility computing module is configured to determine the credibility of each node in the routing table according to the data throughput parameter, the reputation value, and the total difficulty value of the blockchain by: for each node, performing a weighted summation on the data throughput parameter, the reputation value, and the total difficulty value of the blockchain of the node according to predefined weighting coefficients, and determining the credibility of the node according to a result of the weighted summation.

In some embodiments, the credibility computing module is configured to obtain the reputation value of each node according to the historical data of synchronization success rate by calculating the reputation value of each node recursively according to the following formula:

$$\xi = \xi_{-1} + \sqrt{\frac{N}{N+1}} \cdot \varphi$$

in which ξ represents a current reputation value of the node; $\xi_{-1}$ represents a historical reputation value of the node most recently calculated; N is the number of times that the node is successfully synchronized as the target node in a predefined number of most recent node synchronization operations; and φ is a predefined reward and punishment coefficient.

With the device for synchronizing blockchain nodes based on the trust mechanism according to the present disclosure, it can be ensured that the selected target node for synchronization not only has a large TD value, but also has a good network state and a low error probability. Therefore, a stability of the synchronization operation is guaranteed from multiple aspects, and the synchronization success rate is improved.

In order to achieve the above objects, embodiments of a third aspect of the present disclosure provide a non-transitory computer-readable storage medium having a computer program stored thereon, when the program is executed by a processor, the method for synchronizing blockchain nodes based on a trust mechanism according to embodiments of the first aspect is implemented.

In order to achieve the above objects, embodiments of a fourth aspect of the present disclosure provide a computer program product, when instructions in the computer program product are executed by a processor, the method for synchronizing blockchain nodes based on a trust mechanism according to embodiments of the first aspect is implemented.

In order to achieve the above objects, embodiments of a fifth aspect of the present disclosure provide a computing device, including a memory, a processor, and a computer program stored on the memory and executable on the processor, when the computer program is executed by the processor, the method for synchronizing blockchain nodes based on a trust mechanism according to embodiments of the first aspect is implemented.

The non-transitory computer-readable storage medium according to the third aspect of the present disclosure, the computer program product according to the fourth aspect of the present disclosure and the computing device according to the fifth aspect of the present disclosure, have similar beneficial effects as the method for synchronizing blockchain nodes based on a trust mechanism according to the first aspect of the present disclosure and the device for synchronizing blockchain nodes based on a trust mechanism according to the second aspect of the present disclosure, which will be not repeated herein.

BRIEF DESCRIPTION OF THE DRAWINGS

The above and/or additional aspects and advantages of the present disclosure will become apparent and easily understood from the following description of the embodiments with reference to the accompanying drawings, in which.

DETAILED DESCRIPTION

Figure 1:
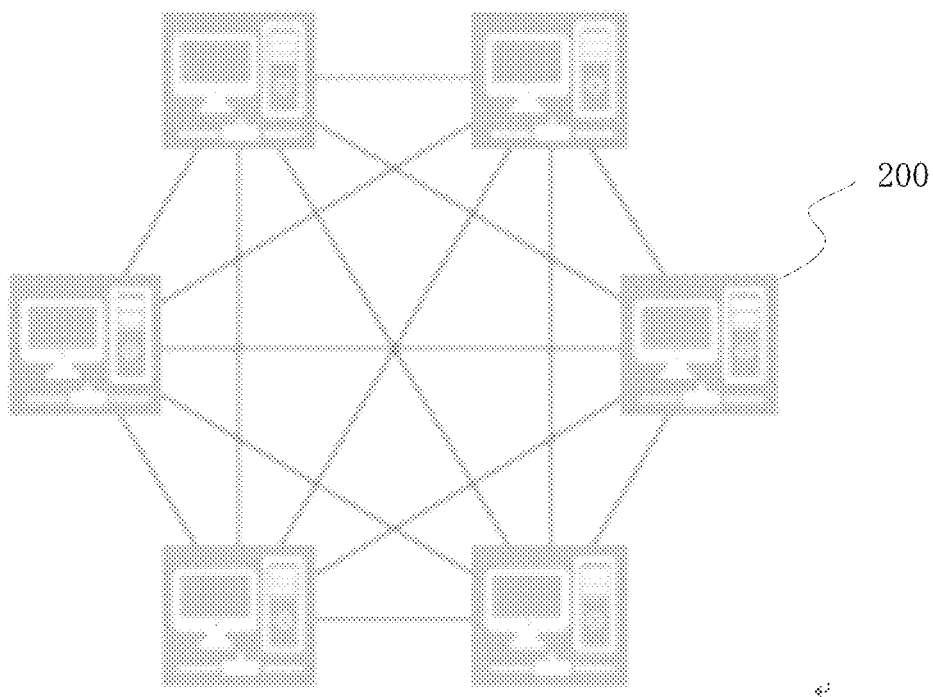
FIG. 1 is a schematic diagram of a communication mode at a network layer of a blockchain system.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

The method and the device according to the embodiments of the present disclosure are described in detail below with reference to the drawings.

FIG. 1 is a schematic diagram of a network communication mode of a blockchain system, in which each node 200 is connected to each other through the Internet. Generally, the blockchain system uses a peer-to-peer (P2P) network technology to connect peer nodes for networking, thereby forming a decentralized network structure. For example, Ethereum blockchain system uses a Kademelia P2P communication protocol based on a distributed hash table (DHT) at the network layer to achieve communication among nodes.

In the DHT protocol, each node has a globally unique identifier "node ID". As a decentralized distribution network structure, in the case of a serverless network, in a default setting, each node maintains its own small-scale routing table, and performs node synchronization and data transmission according to the routing table.

For example, in a setting for Ethereum Kademelia protocol, a routing table maintained by each node is composed of 17 buckets, and each bucket contains 16 nodes. The total number of nodes in the routing table does not exceed 17*16. During the synchronization process, the node obtains a total difficulty (TD) value of a blockchain in block data of each node in the routing table in sequence. The higher the TD value, the higher the height of the blockchain contained in the node, that is, the larger the number of blocks contained in the node. According to the TD value of each node, a node with the maximum TD value is determined as a target node, and new block data is obtained from the target node to complete the synchronization.

When the node wants to initialize the routing table, a request to query its own node is sent to a bootnode, for example, using a command "findnode (selfId, bootnode)". Whenever a node receives the "findnode" request, information of a specified number of nodes (for example, M=16*17) closest to the query initiating node ID is returned to the query initiating node. That is, in the initialization phase, a node can find M nodes closest to itself starting from the bootnode, and use the M nodes as nodes in the routing table.

In the Kademelia protocol, a distance between two nodes is defined by obtaining an XOR value of two node IDs using XOR calculation based on the node IDs and converting the XOR value to an unsigned integer. For example, a distance function is defined as distance (A, B)=|A xor B|, and the smaller the distance, the closer the two nodes.

Therefore, once the node ID is determined, the routing table formed of adjacent nodes calculated based on the node ID rarely changes. However, if a network status of the adjacent node of the current node is not good, such as when the network is frequently disconnected or the network throughput is limited, the synchronization failure often occurs. Once the synchronization is failed, a transaction status of the current node is not up-to-date, which brings great security issues.

To solve problems of instability and low efficiency in the synchronization process using the existing node synchronization methods, the present disclosure provides a method for synchronizing blockchain nodes based on a trust mechanism. When selecting a target node from nodes in the routing table, not only the total difficulty value of the blockchain data stored by each node is considered, but also factors such as a historical network communication status and a historical synchronization success rate of the node are also taken into consideration, and the target node is selected from multiple aspects.

Figure 2:
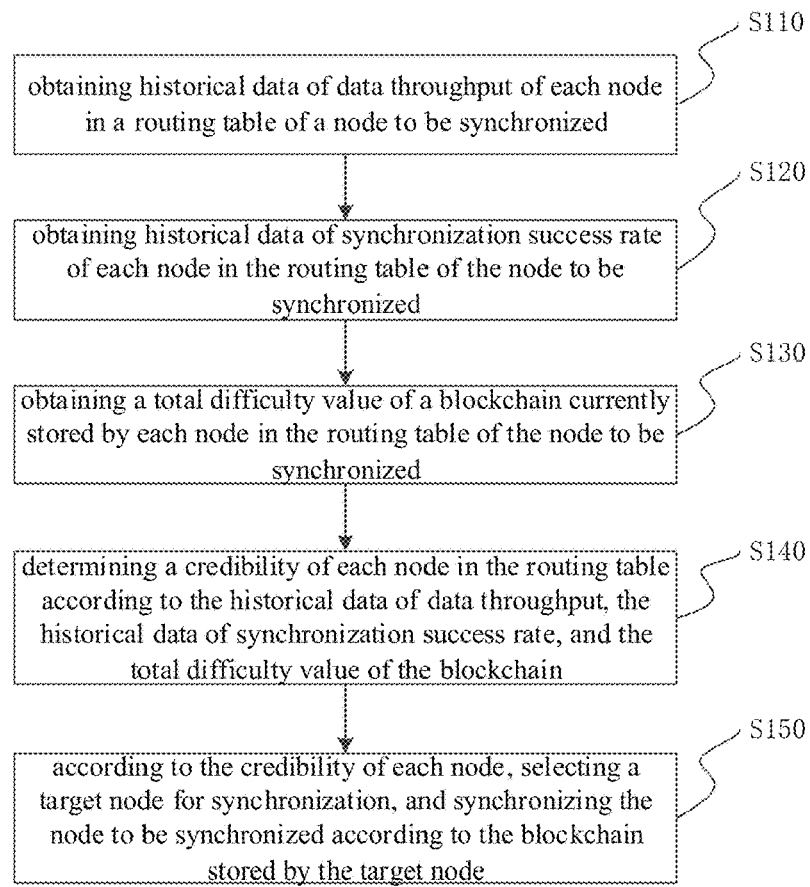
FIG. 2 is a flowchart of a method for synchronizing blockchain nodes based on a trust mechanism according to an embodiment of the present disclosure.

FIG. 2 is a flowchart of a method for synchronizing blockchain nodes based on a trust mechanism according to an embodiment of the present disclosure. The method includes blocks S110 to S150.

At block S110, historical data of data throughput of each node in a routing table of a node to be synchronized is obtained.

The historical data of data throughput of each node is obtained to evaluate a communication condition of each node. Various data throughput parameters can be further set according to requirements. The corresponding data throughput parameter of each node can be calculated according to the data throughput of the node in previous synchronization operations, for the purpose of selecting the target node. For example, the data throughput parameter may be set to an average value T of the data throughput of the node during N data throughputs in a recent predefined time interval:

$$T = \frac{\sum_{i=1}^{N} \text{Throughput}(i)}{N},$$

where Throughput(i) represents throughput of the ith data throughput.

In a specific implementation, the node may maintain a table of historical data throughput of each node in the routing table, which is used to record each data throughput of each node in the routing table.

At block S120, historical data of synchronization success rate of each node in the routing table of the node to be synchronized is obtained.

The historical data of the node's synchronization success rate records the number of synchronization operations and the number of successful synchronizations when the node is used as the target node among N historical synchronization operations closest to the current synchronization, which is used to reflect the node's credibility.

A credibility parameter related to the synchronization success rate may be set, and the credibility parameter is calculated according to the historical data of synchronization success rate of the node, for use in a selection strategy of the target node.

In a specific implementation, the node can maintain a table of synchronization history data of each node in the routing table, which is used to record whether each node in the routing table has been used as a target node in the previous synchronizations and the success or failure of the synchronization.

At block S130, a total difficulty (TD) value of a blockchain currently stored by each node in the routing table of the node to be synchronized is obtained.

Each node maintains its own TD value. The larger the TD value, the longer the chain of the stored blockchain, and the more blocks there are, the more suitable it is as a target node. In related art, the selection of the target node for the synchronization is generally based on only the TD value of the blockchain currently stored by each node in the routing table.

It should be noted that the execution of blocks S110, S120, and S130 does not require a specific order, and can be performed in any order.

At block S140, a credibility of each node in the routing table is determined according to the historical data of data throughput, the historical data of synchronization success rate, and the total difficulty value of the blockchain.

A corresponding credibility evaluation function can be designed according to different usage preferences, and a function value is used as a score value of the credibility. Inputs of the credibility evaluation function include variables related to the historical data of data throughput, the historical data of synchronization success rate, and the total difficulty value of the blockchain, and an output is used to describe whether the node is suitable for use as a target node for synchronization. For example, a credibility evaluation function may be set, and a node with a higher score value is more suitable as the target node for synchronization.

For example, in some embodiments, an average value of the data throughput of each node in a recent predefined time interval is calculated according to the historical data of data throughput, and the average value is used as a data throughput parameter. A reputation value of each node is obtained according to the historical data of synchronization success rate, and the reputation value is a value calculated according to a predefined rule based on the historical data of synchronization success rate. The credibility of each node is determined according to the data throughput parameter, the reputation value, and the total difficulty value of the blockchain. Specifically, for each node, a weighted summation is performed on the data throughput parameter, the reputation value, and the total difficulty value of the blockchain according to predefined weighting coefficients, and the score value of the credibility of the node is determined according to a result of the weighted summation. The credibility evaluation function is set as:

$$\text{Score} = \alpha_1 \cdot TD + \alpha_2 \cdot T + \alpha_3 \cdot \xi$$

where Score represents the score value of the credibility of the node, TD represents the TD value of the blockchain of the node, T represents the average value of the data throughput, and $\xi$ represents the reputation value of the node. $\alpha_1$, $\alpha_2$ and $\alpha_3$ are corresponding weighting coefficients, which can be set according to usage preferences.

For the convenience of calculation, the weighting coefficients can be normalized, that is, let $\Sigma_{i=1}^{3} \alpha_i = 1$.

The node's reputation value $\xi$ can be recursively calculated according to the following formula:

$$\xi = \xi_{-1} + \sqrt{\frac{N}{N+1}} \cdot \varphi$$

$\xi$ represents a current reputation value of the node; $\xi_{-1}$ represents a historical reputation value of the node most recently calculated; N is the number of times that the node is successfully synchronized as the target node in a predefined number of most recent node synchronization operations; and $\varphi$ is a predefined reward and punishment coefficient. A corresponding value is set for $\varphi$ based on whether the synchronization is succeed.

$$\varphi = \begin{cases} 1, \text{ the synchronization is succeed} \\ -0.8, \text{ the synchronization fails due to a malicious node} \\ -0.2, \text{ the synchronization fails due to other reasons} \end{cases}$$

When calculating the reputation value, if the current synchronization is successful, the reputation value of the node is increased; if the current synchronization is failed, the reputation value of the node is decreased. The values of –0.8 and 0.2 of the coefficient are merely described as an example, which can be modified as needed, for example, the coefficient for the synchronization failure due to the malicious node is set to 3-5 times the coefficient for the synchronization failure due to other reasons. $\xi_{-1}$ is the reputation value of the current node which has been recorded in history. During the first synchronization, the initial value of $\xi$ is set to 0.

The node synchronization may be failed due to a poor network status, or an abnormality of the node itself. The node which is abnormality itself is more likely to be a malicious node. Therefore, in some embodiments, for a node for which the connection status is good but the synchronization is failed, it can be determined that the synchronization is failed due to the malicious node. In specific practice, return information of the node for which the synchronization is failed can be obtained, and based on the returned information, it can be determined whether the synchronization failure of the node is caused by the malicious node or other reasons. For example, in the Ethereum blockchain, the failure information returned by a node for which the synchronization is failed may include one or more of the following information:

errBusy=errors.New("busy")
errUnknownPeer=errors.New("peer is unknown or unhealthy")
errBadPeer=errors.New("action from bad peer ignored")
errStallingPeer=errors.New("peer is stalling")
errNoPeers=errors.New("no peers to keep download active")
errTimeout=errors.New("timeout")
errEmptyHeaderSet=errors.New("empty header set by peer")
errPeersUnavailable=errors.New("no peers available or all tried for download")
errInvalidAncestor=errors.New("retrieved ancestor is invalid")
errInvalidChain=errors.New("retrieved hash chain is invalid")
errInvalidBlock=errors.New("retrieved block is invalid")
errInvalidBody=errors.New("retrieved block body is invalid")
errInvalidReceipt=errors.New("retrieved receipt is invalid")
errCancelBlockFetch=errors.New("block download canceled (requested)")
errCancelHeaderFetch=errors.New("block header download canceled (requested)")

errCancelBodyFetch=errors.New("block body download canceled (requested)")
errCancelReceiptFetch=errors.New("receipt download canceled (requested)")
errCancelStateFetch=errors.New("state data download canceled (requested)")
errCancelHeaderProcessing=errors.New("header processing canceled (requested)")
errCancelContentProcessing=errors.New("content processing canceled (requested)")
errNoSyncActive=errors.New("no sync active")
errTooOld=errors.New("peer doesn't speak recent enough protocol version (need version >=62)")

When the failure information includes one or more of errBadPeer, errStallingPeer, errEmptyHeaderSet, errInvalidAncestor, errInvalidChain, the node can be determined as a malicious node.

$$\sqrt{\frac{N}{N+1}}$$

is a weight of the reward and punishment coefficient, and its purpose is to prevent the malicious node from increasing its reputation value through a small amount of high-quality services. As N increases, the value of $$\sqrt{\frac{N}{N+1}}$$

gradually approaches 1, and when N is small, the weight $$\sqrt{\frac{N}{N+1}}$$

is small. For example, N is the number of successful synchronizations in the most recent 300 synchronization operations. Compared with a node which is successfully synchronized for 100 times, the reputation value of a node which is successfully synchronized only once is smaller.

At block S150, according to the credibility of each node, a target node for synchronization is selected, and the node to be synchronized is synchronized according to the blockchain stored by the target node.

When a node is synchronized, a score value of each node in the routing table of the node is calculated in sequence. The node with the highest score value is determined as an optimal node and selected as the target node for the synchronization. The synchronization is performed according to the blockchain data stored by the target node.

With the method for synchronizing blockchain nodes based on the trust mechanism according to the present disclosure, it can be ensured that the selected target node for synchronization not only has a large TD value, but also has a good network state and a low error probability. Therefore, a stability of the synchronization operation is guaranteed from multiple aspects, and the synchronization success rate is improved.

In order to implement the method according to the embodiments of the first aspect, embodiments of the second aspect of the present disclosure provides a device for synchronizing blockchain nodes based on a trust mechanism.

An implementation of the device for synchronizing blockchain nodes may include one or more computing devices, the computing device includes a processor and a memory, and an application program including computer program instructions executable on the processor is stored on the memory. The application program has a plurality of program modules for corresponding functions of each component of the system. The division of program modules is logical rather than physical. Each program module can run on one or more computing devices, and one computing device can also have one or more program modules running thereon. The device for synchronizing blockchain nodes of the present disclosure is described in detail according to the functional logic division of the program modules.

Figure 3:
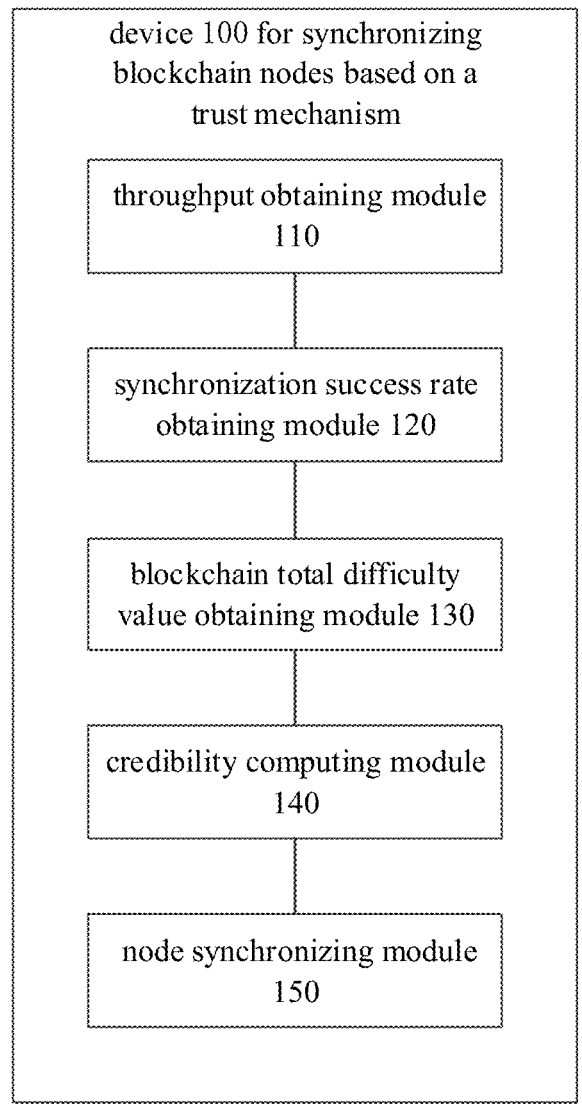
FIG. 3 is a block diagram of a device for synchronizing blockchain nodes based on a trust mechanism according to an embodiment of the present disclosure.

FIG. 3 is a block diagram of a device for synchronizing blockchain nodes based on a trust mechanism according to an embodiment of the present disclosure. The device 100 for synchronizing blockchain nodes based on the trust mechanism includes: a throughput obtaining module 110, a synchronization success rate obtaining module 120, a blockchain total difficulty value obtaining module 130, a credibility computing module 140, and a node synchronizing module 150.

The device 100 for synchronizing blockchain nodes based on the trust mechanism may be implemented by a computing device including a processor and a memory. The memory stores program modules that can be executed by the processor. When each program module is executed, the computing device is controlled to implement a corresponding function.

The device 100 for synchronizing blockchain nodes based on the trust mechanism may be implemented by a computing device including a processor and a memory. The memory stores program modules that can be executed by the processor. When each program module is executed, the computing device is controlled to implement a corresponding function. For example, the throughput obtaining module 110, the synchronization success rate obtaining module 120, the blockchain total difficulty value obtaining module 130, the credibility computing module 140, and the node synchronizing module 150 may be implemented as such program modules.

The throughput obtaining module 110 is configured to obtain historical data of data throughput of each node in a routing table of a node to be synchronized.

The synchronization success rate obtaining module 120 is configured to obtain historical data of synchronization success rate of each node in the routing table of the node to be synchronized.

The blockchain total difficulty value obtaining module 130 is configured to obtain a total difficulty value of a blockchain currently stored by each node in the routing table of the node to be synchronized.

The credibility computing module 140 is configured to determine a credibility of each node in the routing table according to the historical data of data throughput, the historical data of synchronization success rate, and the total difficulty value of the blockchain.

The credibility computing module determines the credibility of each node in the routing table according to the historical data of data throughput, the historical data of synchronization success rate, and the total difficulty value of the blockchain, as follows: calculating an average value of the data throughput of each node in a recent predefined time interval according to the historical data of data throughput, and using the average value as a data throughput parameter; obtaining a reputation value of each node according to the historical data of synchronization success rate, in which the reputation value is a value calculated according to a predefined rule based on the historical data of synchronization success rate; and determining the credibility of each node according to the data throughput parameter, the reputation value, and the total difficulty value of the blockchain.

In some embodiments, the credibility computing module is configured to obtain the reputation value of each node according to the historical data of synchronization success rate by calculating the reputation value of each node recursively according to the following formula:

$$\xi = \xi_{-1} + \sqrt{\frac{N}{N+1}} \cdot \varphi$$

where $\xi$ represents a current reputation value of the node; $\xi_{-1}$ represents a historical reputation value of the node most recently calculated; N is the number of times that the node is successfully synchronized as the target node in a predefined number of most recent node synchronization operations; and $\varphi$ is a predefined reward and punishment coefficient.

For each node, a weighted summation is performed on the data throughput parameter, the reputation value, and the total difficulty value of the blockchain according to predefined weighting coefficients, and the credibility of the node is determined according to a result of the weighted summation. For example, it is calculated according to the following formula:

$$\text{Score} = \alpha_1 \cdot \text{TD} + \alpha_2 \cdot T + \alpha_3 \cdot \xi$$

where Score represents a score value of the credibility of the node, TD represents the TD value of the blockchain of the node, T represents the average value of the data throughput, and $\xi$ represents the reputation value of the node. $\alpha_1$, $\alpha_2$ and $\alpha_3$ are corresponding weighting coefficients, which can be set according to usage preferences.

The node synchronizing module 150 is configured to according to the credibility of each node, select a target node for synchronization, and synchronize the node to be synchronized according to the blockchain stored by the target node.

For details of functions of each module in the device for synchronizing blockchain nodes based on the trust mechanism according to the disclosure and the implementation of the functions, reference may be made to the implementation of the corresponding steps in the above method. For the device embodiment, since it basically corresponds to the method embodiment, the foregoing explanation of the method embodiment of the present disclosure is also applicable to the device embodiment of the present disclosure. In order to avoid redundancy, all details will not be repeated in the device embodiment. For related unresolved details, please refer to the above description of the embodiments of the method for synchronizing blockchain nodes based on the trust mechanism with reference to FIG. 1 to FIG. 2.

With the device for synchronizing blockchain nodes based on the trust mechanism according to the present disclosure, it can be ensured that the selected target node for synchronization not only has a large TD value, but also has a good network state and a low error probability. Therefore, a stability of the synchronization operation is guaranteed from multiple aspects, and the synchronization success rate is improved.

Embodiments of the third aspect of the present disclosure provide a non-transitory computer-readable storage medium having executable instructions stored thereon, and when the executable instructions are run on a processor, the method for synchronizing blockchain nodes based on the trust mechanism according to embodiments of the first aspect is implemented.

The computer instructions used to implement the method of the present disclosure may be carried in any combination of one or more computer-readable mediums. The so-called non-transitory computer-readable medium may include any computer-readable medium, except for the signal itself which is temporarily propagated. The computer-readable storage medium may include, but is not limited to, an electronic, magnetic, optical, electromagnetic, infrared, or semiconductor system, apparatus, or device, or any suitable combination of the foregoing. More specific examples (not exhaustive) of computer-readable storage media include electrical connections based on one or more wires, portable computer disks, hard disks, random access memories (RAM), read-only memories (ROM), erasable programmable read-only memories (EPROM or flash memory), fiber optics, compact disc read-only memories (CD-ROM), optical storage devices, magnetic storage devices, or any suitable combination of the foregoing. In the present disclosure, a computer-readable storage medium may be any tangible medium that contains or stores a program that can be used by or in combination with an instruction execution system, apparatus, or device.

Embodiments of the fourth aspect of the present disclosure provide a computer program product, when instructions in the computer program product are executed by a processor, the method for synchronizing blockchain nodes based on the trust mechanism according to embodiments of the first aspect is implemented.

The computer program code for carrying out operations of embodiments of the present disclosure may be written in one or more programming languages. The programming language includes an object oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer through any kind of network, including a Local Area Network (hereafter referred as to LAN) or a Wide Area Network (hereafter referred as to WAN), or connected to an external computer (such as using an Internet service provider through the Internet).

Embodiments of the fifth aspect of the present disclosure provide a computing device including a memory, a processor, and a computer program stored on the memory and executable on the processor. When the program is executed by the processor, the method for synchronizing blockchain nodes based on the trust mechanism according to embodiments of the first aspect is implemented.

Figure 4:
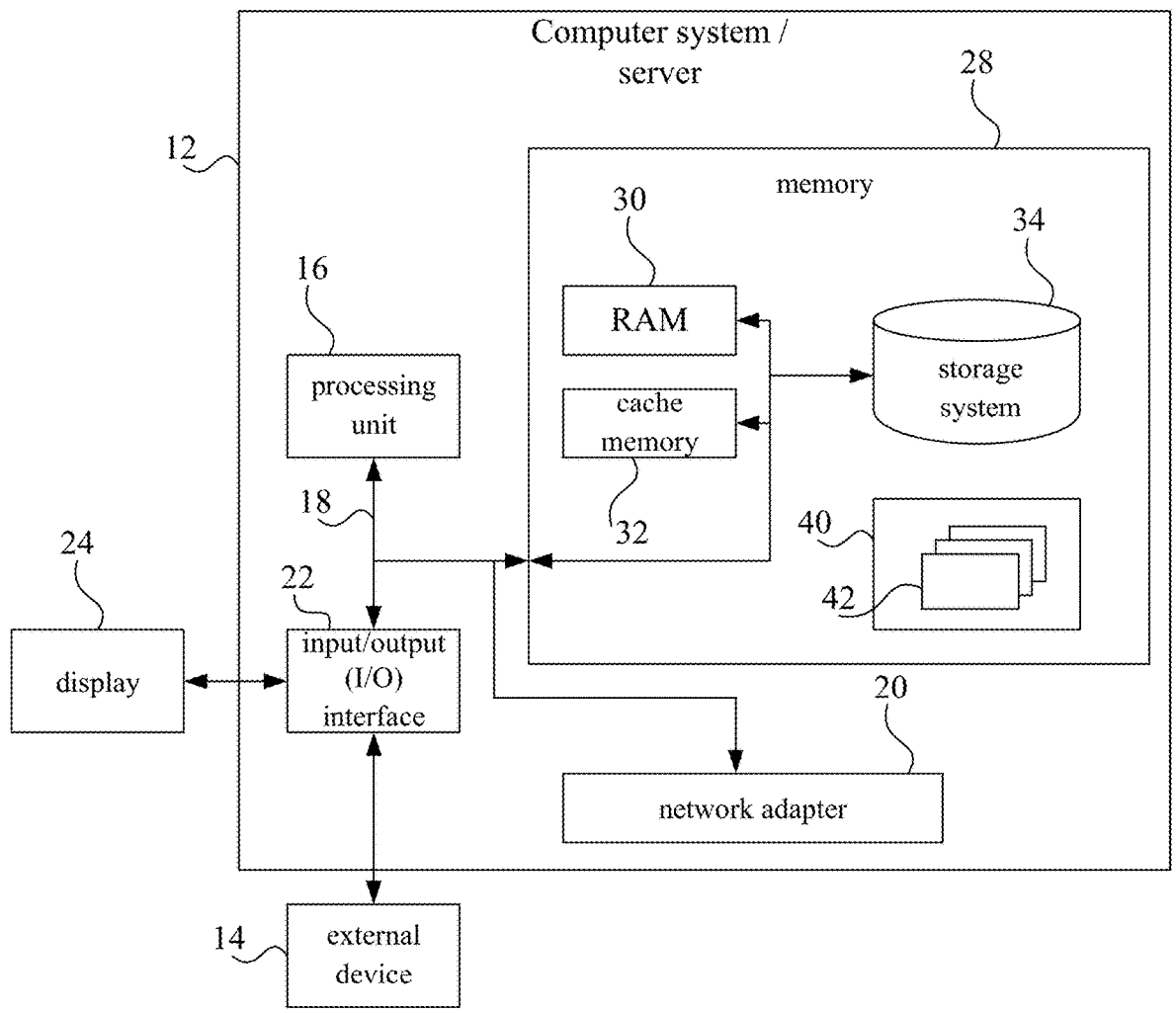
FIG. 4 is a schematic diagram of a computing device according to an embodiment of the present disclosure.

FIG. 4 is a schematic diagram of a computing device according to an embodiment of the present disclosure. The computing device 12 illustrated in FIG. 4 is merely an example and should not impose any limitation on the functions and scope of use of the embodiments of the present disclosure.

As illustrated in FIG. 4, the computing device 12 is in the form of a general-purpose computing apparatus. The computing device 12 may include, but is not limited to, one or more processors or processing units 16, a system memory 28, and a bus 18 connecting different system components (including the system memory 28 and the processing unit 16).

The bus 18 represents one or more of several types of bus architectures, including a memory bus or a memory control bus, a peripheral bus, a graphic acceleration port (GAP) bus, a processor bus, or a local bus using any bus architecture in a variety of bus architectures. For example, these architectures include, but are not limited to, an industry standard architecture (ISA) bus, a micro-channel architecture (MCA) bus, an enhanced ISA bus, a video electronic standards association (VESA) local bus, and a peripheral component interconnect (PCI) bus.

Typically, the computing device 12 may include multiple kinds of computer-readable media. These media may be any storage media accessible by the computing device 12, including transitory or non-transitory storage medium and movable or unmovable storage medium.

The memory 28 may include a computer-readable medium in a form of volatile memory, such as a random access memory (RAM) 30 and/or a high-speed cache memory 32. The computing device 12 may further include other transitory/non-transitory storage media and movable/unmovable storage media. In way of example only, the storage system 34 may be used to read and write non-removable, non-volatile magnetic media (not shown in the figure, commonly referred to as "hard disk drives"). Although not illustrated in FIG. 4, it may be provided a disk driver for reading and writing movable non-volatile magnetic disks (e.g. "floppy disks"), as well as an optical driver for reading and writing movable non-volatile optical disks (e.g. a compact disc read only memory (CD-ROM, a digital video disc read only Memory (DVD-ROM), or other optical media). In these cases, each driver may be connected to the bus 18 via one or more data medium interfaces. The memory 28 may include at least one program product, which has a set of (for example at least one) program modules configured to perform the functions of embodiments of the present disclosure.

A program/application 40 with a set of (at least one) program modules 42 may be stored in memory 28, the program modules 42 may include, but not limit to, an operating system, one or more application programs, other program modules and program data, and any one or combination of above examples may include an implementation in a network environment. The program modules 42 are generally configured to implement functions and/or methods described in embodiments of the present disclosure.

The computing device 12 may also communicate with one or more external devices 14 (e.g., a keyboard, a pointing device, a display 24, and etc.) and may also communicate with one or more devices that enables a user to interact with the computer system/server 12, and/or any device (e.g., a network card, a modem, and etc.) that enables the computer system/server 12 to communicate with one or more other computing devices. This kind of communication can be achieved by the input/output (I/O) interface 22. In addition, the device 12 may be connected to and communicate with one or more networks such as a local area network (LAN), a wide area network (WAN) and/or a public network such as the Internet through a network adapter 20. As shown, the network adapter 20 communicates with other modules of the device 12 over bus 18. It should be understood that although not shown in the figure, other hardware and/or software modules may be used in combination with the device 12, which including, but not limited to, microcode, device drivers, redundant processing units, external disk drive arrays, RAID systems, tape drives, as well as data backup storage systems and the like.

The processing unit 16 can perform various functional applications and data processing by running programs stored in the system memory 28, for example, to perform the quality evaluating method provided by embodiments of the present disclosure.

The non-transitory computer-readable storage medium, the computer program product, and the computing device according to embodiments of the third to fifth aspects of the present disclosure can be implemented with reference to the content specifically described in the embodiment of the first aspect of the present disclosure, and have similar beneficial effects as the method for synchronizing blockchain nodes based on a trust mechanism, which is not repeated here.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means at least two, for example, two or three, unless specified otherwise.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations for example, the order of execution may differ from that which is depicted, or the order of execution of two or more boxes shown in succession in the flow chart may be executed concurrently or with partial concurrence, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Although embodiments of present disclosure have been shown and described above, it should be understood that above embodiments are just explanatory, and cannot be construed to limit the present disclosure, for those skilled in the art, changes, alternatives, and modifications can be made to the embodiments without departing from spirit, principles and scope of the present disclosure.

What is claimed is:

1. A method for synchronizing blockchain nodes based on a trust mechanism, comprising:
    obtaining historical data of data throughput of each node in a routing table of a node to be synchronized;
    obtaining historical data of synchronization success rate of each node in the routing table of the node to be synchronized;
    obtaining a total difficulty value of a blockchain currently stored by each node in the routing table of the node to be synchronized;
    determining a credibility of each node in the routing table according to the historical data of data throughput, the historical data of synchronization success rate, and the total difficulty value of the blockchain; and
    selecting a target node for synchronization according to the credibility of each node, and synchronizing the node to be synchronized according to the blockchain stored by the target node.

2. The method according to claim 1, wherein determining the credibility of each node in the routing table according to the historical data of data throughput, the historical data of synchronization success rate, and the total difficulty value of the blockchain, comprises:
    calculating an average value of the data throughput of each node in a recent predefined time interval according to the historical data of data throughput, and using the average value as a data throughput parameter;
    obtaining a reputation value of each node according to the historical data of synchronization success rate, wherein the reputation value is a value calculated according to a predefined rule based on the historical data of synchronization success rate; and
    determining the credibility of each node according to the data throughput parameter, the reputation value, and the total difficulty value of the blockchain.

3. The method according to claim 2, wherein determining the credibility of each node in the routing table according to the data throughput parameter, the reputation value, and the total difficulty value of the blockchain, comprises:
    for each node, performing a weighted summation on the data throughput parameter, the reputation value, and the total difficulty value of the blockchain according to predefined weighting coefficients, and determining the credibility of the node according to a result of the weighted summation.

4. The method according to claim 2, wherein obtaining the reputation value of each node according to the historical data of synchronization success rate comprises calculating the reputation value of each node recursively according to the following formula:

$$\xi = \xi_{-1} + \sqrt{\frac{N}{N+1}} \cdot \varphi$$

where $\xi$ represents a current reputation value of the node; $\xi_{-1}$ represents a historical reputation value of the node most recently calculated; N is a number of times that the node is successfully synchronized as the target node in a predefined number of most recent node synchronization operations; and $\varphi$ is a predefined reward and punishment coefficient.

5. The method according to claim 3, wherein obtaining the reputation value of each node according to the historical data of synchronization success rate comprises calculating the reputation value of each node recursively according to the following formula:

$$\xi = \xi_{-1} + \sqrt{\frac{N}{N+1}} \cdot \varphi$$

where $\xi$ represents a current reputation value of the node; $\xi_{-1}$ represents a historical reputation value of the node most recently calculated; N is a number of times that the node is successfully synchronized as the target node in a predefined number of most recent node synchronization operations; and $\varphi$ is a predefined reward and punishment coefficient.

6. A non-transitory computer-readable storage medium having a computer program stored thereon, wherein when the program is executed by a processor, the processor is caused to implement the method for synchronizing blockchain nodes based on a trust mechanism comprising:
    obtaining historical data of data throughput of each node in a routing table of a node to be synchronized;
    obtaining historical data of synchronization success rate of each node in the routing table of the node to be synchronized;
    obtaining a total difficulty value of a blockchain currently stored by each node in the routing table of the node to be synchronized;
    determining a credibility of each node in the routing table according to the historical data of data throughput, the historical data of synchronization success rate, and the total difficulty value of the blockchain; and
    selecting a target node for synchronization according to the credibility of each node, and synchronizing the node to be synchronized according to the blockchain stored by the target node.

7. A computing device, comprising: a memory, a processor, and a computer program stored on the memory and executable on the processor, wherein when the computer program is executed by the processor, the processor is configured to synchronize blockchain nodes based on a trust mechanism by:

obtaining historical data of data throughput of each node in a routing table of a node to be synchronized;

obtaining historical data of synchronization success rate of each node in the routing table of the node to be synchronized;

obtaining a total difficulty value of a blockchain currently stored by each node in the routing table of the node to be synchronized;

determining a credibility of each node in the routing table according to the historical data of data throughput, the historical data of synchronization success rate, and the total difficulty value of the blockchain; and selecting a target node for synchronization according to the credibility of each node, and synchronizing the node to be synchronized according to the blockchain stored by the target node.

8. The non-transitory computer-readable storage medium according to claim 6, wherein determining the credibility of each node in the routing table according to the historical data of data throughput, the historical data of synchronization success rate, and the total difficulty value of the blockchain, comprises:

calculating an average value of the data throughput of each node in a recent predefined time interval according to the historical data of data throughput, and using the average value as a data throughput parameter;

obtaining a reputation value of each node according to the historical data of synchronization success rate, wherein the reputation value is a value calculated according to a predefined rule based on the historical data of synchronization success rate; and determining the credibility of each node according to the data throughput parameter, the reputation value, and the total difficulty value of the blockchain.

9. The non-transitory computer-readable storage medium according to claim 8, wherein determining the credibility of each node in the routing table according to the data throughput parameter, the reputation value, and the total difficulty value of the blockchain, comprises:

for each node, performing a weighted summation on the data throughput parameter, the reputation value, and the total difficulty value of the blockchain according to predefined weighting coefficients, and determining the credibility of the node according to a result of the weighted summation.

10. The non-transitory computer-readable storage medium according to claim 8, wherein obtaining the reputation value of each node according to the historical data of synchronization success rate comprises calculating the reputation value of each node recursively according to the following formula:

$$\xi = \xi_{-1} + \sqrt{\frac{N}{N+1}} \cdot \varphi$$

where $\xi$ represents a current reputation value of the node; $\xi_{-1}$ represents a historical reputation value of the node most recently calculated; N is a number of times that the node is successfully synchronized as the target node in a predefined number of most recent node synchronization operations; and $\varphi$ is a predefined reward and punishment coefficient.

11. The non-transitory computer-readable storage medium according to claim 9, wherein obtaining the reputation value of each node according to the historical data of synchronization success rate comprises calculating the reputation value of each node recursively according to the following formula:

$$\xi = \xi_{-1} + \sqrt{\frac{N}{N+1}} \cdot \varphi$$

where $\xi$ represents a current reputation value of the node; $\xi_{-1}$ represents a historical reputation value of the node most recently calculated; N is a number of times that the node is successfully synchronized as the target node in a predefined number of most recent node synchronization operations; and $\varphi$ is a predefined reward and punishment coefficient.

12. The computing device according to claim 7, wherein determining the credibility of each node in the routing table according to the historical data of data throughput, the historical data of synchronization success rate, and the total difficulty value of the blockchain, comprises:

calculating an average value of the data throughput of each node in a recent predefined time interval according to the historical data of data throughput, and using the average value as a data throughput parameter;

obtaining a reputation value of each node according to the historical data of synchronization success rate, wherein the reputation value is a value calculated according to a predefined rule based on the historical data of synchronization success rate; and determining the credibility of each node according to the data throughput parameter, the reputation value, and the total difficulty value of the blockchain.

13. The computing device according to claim 12, wherein determining the credibility of each node in the routing table according to the data throughput parameter, the reputation value, and the total difficulty value of the blockchain, comprises:

for each node, performing a weighted summation on the data throughput parameter, the reputation value, and the total difficulty value of the blockchain according to predefined weighting coefficients, and determining the credibility of the node according to a result of the weighted summation.

14. The computing device according to claim 12, wherein obtaining the reputation value of each node according to the historical data of synchronization success rate comprises calculating the reputation value of each node recursively according to the following formula:

$$\xi = \xi_{-1} + \sqrt{\frac{N}{N+1}} \cdot \varphi$$

where $\xi$ represents a current reputation value of the node; $\xi_{-1}$ represents a historical reputation value of the node most recently calculated; N is a number of times that the node is successfully synchronized as the target node in a predefined number of most recent node synchronization operations; and φ is a predefined reward and punishment coefficient.

15. The computing device according to claim 13, wherein obtaining the reputation value of each node according to the historical data of synchronization success rate comprises calculating the reputation value of each node recursively according to the following formula:

$$\xi = \xi_{-1} + \sqrt{\frac{N}{N+1}} \cdot \varphi$$

where $\xi$ represents a current reputation value of the node; $\xi_{-1}$ represents a historical reputation value of the node most recently calculated; N is a number of times that the node is successfully synchronized as the target node in a predefined number of most recent node synchronization operations; and φ is a predefined reward and punishment coefficient.

* * * * *